United States Patent
Araki (10) Patent No.: US 11,050,358 B2
(45) Date of Patent: Jun. 29, 2021

(54) POWER MODULE WITH BUILT-IN DRIVE CIRCUIT

(71) Applicant: FUJI ELECTRIC CO., LTD., Kawasaki (JP)

(72) Inventor: Ryu Araki, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/909,598

(22) Filed: Jun. 23, 2020

(65) Prior Publication Data
US 2020/0321901 A1    Oct. 8, 2020

Related U.S. Application Data

(63) Continuation of application No. PCT/JP2019/021745, filed on May 31, 2019.

(30) Foreign Application Priority Data

Jul. 17, 2018 (JP) .............................. JP2018-134137

(51) Int. Cl.
*H02M 1/088* (2006.01)
*H02M 7/5387* (2007.01)
(Continued)

(52) U.S. Cl.
CPC ......... *H02M 7/5387* (2013.01); *H02M 1/088* (2013.01); *H02M 2001/0009* (2013.01); *H02P 27/06* (2013.01)

(58) Field of Classification Search
CPC ....... H02M 1/32; H02M 7/5387–5395; H02M 2001/0009; H02M 1/08–096; H02P 27/06
See application file for complete search history.

(56) References Cited

U.S. PATENT DOCUMENTS 6,127,746 A    10/2000 Clemente
6,215,634 B1    4/2001 Terasawa
(Continued)

FOREIGN PATENT DOCUMENTS

GB    2318467 A    4/1998
GB    2336259 A    10/1999
(Continued)

OTHER PUBLICATIONS

International Search Report for PCT/JP2019/021745, dated Aug. 6, 2019.
Written Opinion for PCT/JP2019/021745, dated Aug. 6, 2019.

*Primary Examiner* — Patrick C Chen
(74) *Attorney, Agent, or Firm* — Rabin & Berdo, P.C.

(57) ABSTRACT

A power module including a half bridge circuit having first and second switching elements respectively included in an upper arm and a lower arm thereof, and upper and lower arm drive circuits which respectively drive the first and second switching elements. The power module includes a first ground terminal on a ground side of the second switching element, a second ground terminal connected, via a first ground wiring, to the first ground terminal, a third ground terminal connected, via a second ground wiring including a dumping resistor, to the first ground terminal, a current detection circuit detecting a current flowing through the second switching element, and a control ground switching circuit which performs switching according to a value of the current detected by the current detection circuit, so as to connect a ground terminal of the lower arm drive circuit to the second or third ground terminal.

6 Claims, 6 Drawing Sheets

(51) Int. Cl.
    *H02P 27/06*     (2006.01)
    *H02M 1/00*      (2006.01)

(56)  References Cited

U.S. PATENT DOCUMENTS

| | | | | |
|---|---|---|---|---|
| 2001/0026429 A1* | 10/2001 | Fukuda | .............. | H03K 17/0828 |
| | | | | 361/93.9 |
| 2002/0089321 A1 | 7/2002 | Matsuda | | |
| 2014/0021893 A1* | 1/2014 | Komatsu | .................. | H02H 3/08 |
| | | | | 318/400.22 |
| 2014/0084967 A1* | 3/2014 | Hosono | ................ | H03K 17/168 |
| | | | | 327/109 |
| 2014/0111171 A1 | 4/2014 | Kosugi | | |
| 2015/0035569 A1* | 2/2015 | Miura | .................. | H03K 17/168 |
| | | | | 327/109 |
| 2017/0005570 A1* | 1/2017 | Nakashima | ......... | H02M 7/5387 |
| 2018/0159522 A1 | 6/2018 | Sato | | |

FOREIGN PATENT DOCUMENTS

| | | | |
|---|---|---|---|
| GB | 2351860 | A | 1/2001 |
| JP | H10-173500 | A | 6/1998 |
| JP | H11-299221 | A | 10/1999 |
| JP | 2002-204581 | A | 7/2002 |
| JP | 2014-087180 | A | 5/2014 |
| JP | 2016-197821 | A | 11/2016 |
| JP | 2018-093681 | A | 6/2018 |

\* cited by examiner

POWER MODULE WITH BUILT-IN DRIVE CIRCUIT

CROSS-REFERENCE TO RELATED APPLICATION

This application is a continuation application of International Application PCT/JP2019/021745 filed on May 31, 2019 which designated the U.S., which claims priority to Japanese Patent Application No. 2018-134137, filed on Jul. 17, 2018, the entire contents of which are incorporated herein by reference.

BACKGROUND OF THE INVENTION

1. Field of the Invention

The embodiments discussed herein relate to a power module with a built-in drive circuit.

2. Background of the Related Art

With motor drive inverters a power module including a plurality of combinations of a half bridge circuit made up of two switching elements connected in series and a drive circuit which on-off drives the switching elements is used.

Figure 5:
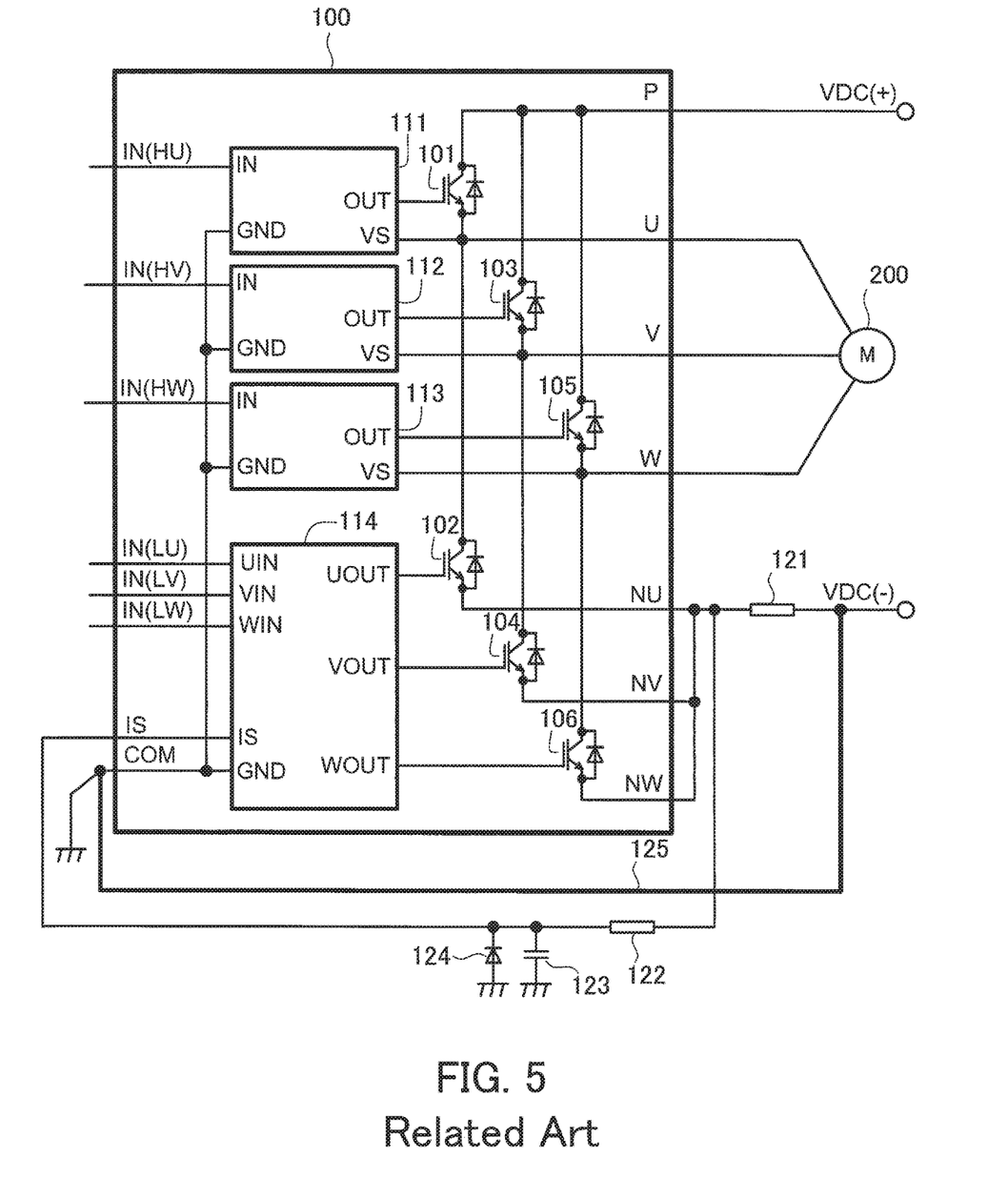
FIG. 5 is a circuit diagram illustrative of an example of the structure of a power module used in a three-phase motor drive inverter.
Figure 6A:
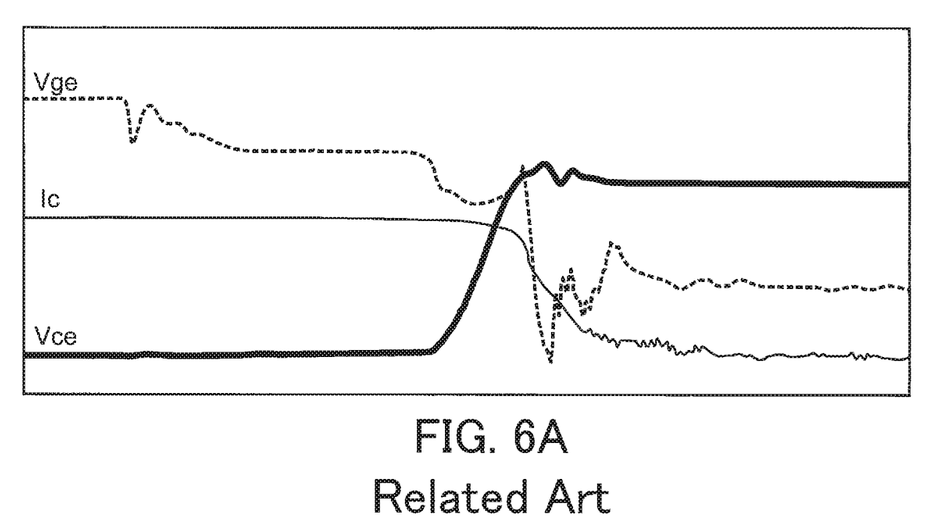
FIGS. 6A and 6B illustrate switching waveforms obtained when a lower-arm switching element is turned off, FIG. 6A illustrating switching waveforms obtained at normal operation time, FIG. 6B illustrating switching waveforms obtained at abnormal operation time.
Figure 6B:
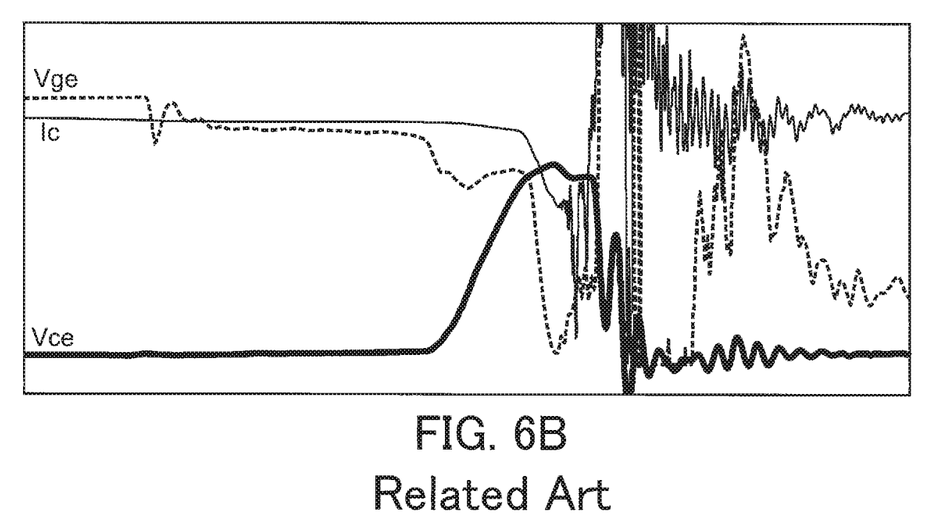

FIG. 5 is a circuit diagram illustrative of an example of the structure of a power module used in a three-phase motor drive inverter. FIGS. 6A and 6B illustrate switching waveforms obtained when a lower-arm switching element is turned off. FIG. 6A illustrates switching waveforms obtained at normal operation time and FIG. 6B illustrates switching waveforms obtained at abnormal operation time.

A power module 100 illustrated in FIG. 5 is a power converter which supplies alternating power to a three-phase motor 200. Accordingly, the power module 100 includes three half bridge circuits for the U phase, the V phase, and the W phase. A U-phase half bridge circuit is made up of switching elements 101 and 102. A V-phase half bridge circuit is made up of switching elements 103 and 104. A W-phase half bridge circuit is made up of switching elements 105 and 106. An insulated gate bipolar transistor (IGBT) and a freewheeling diode connected to collector and emitter terminals of the IGBT in inverse parallel therewith are used as each of the switching elements 101 through 106. A metal-oxide-semiconductor field-effect transistor (MOSFET) may be used as each of the switching elements 101 through 106.

A collector terminal of the switching element 101 included in the upper arm of the U-phase half bridge circuit is connected to a P terminal of the power module 100. The P terminal is connected to a positive electrode terminal VDC(+) of a direct-current power source. An emitter terminal of the switching element 101 is connected to a collector terminal of the switching element 102 included in the lower arm of the U-phase half bridge circuit and a U terminal of the power module 100. The U terminal is connected to a U-phase terminal of the three-phase motor 200.

A collector terminal of the switching element 103 included in the upper arm of the V-phase half bridge circuit is connected to the P terminal of the power module 100. An emitter terminal of the switching element 103 is connected to a collector terminal of the switching element 104 included in the lower arm of the V-phase half bridge circuit and a V terminal of the power module 100. The V terminal is connected to a V-phase terminal of the three-phase motor 200.

A collector terminal of the switching element 105 included in the upper arm of the W-phase half bridge circuit is connected to the P terminal of the power module 100. An emitter terminal of the switching element 105 is connected to a collector terminal of the switching element 106 included in the lower arm of the W-phase half bridge circuit and a W terminal of the power module 100. The W terminal is connected to a W-phase terminal of the three-phase motor 200.

A gate terminal of the switching element 101 included in the U-phase upper arm is connected to an OUT terminal of an upper arm drive circuit 111. The emitter terminal of the switching element 101 is connected to a VS terminal of the upper arm drive circuit 111.

A gate terminal of the switching element 103 included in the V-phase upper arm is connected to an OUT terminal of an upper arm drive circuit 112. The emitter terminal of the switching element 103 is connected to a VS terminal of the upper arm drive circuit 112.

A gate terminal of the switching element 105 included in the W-phase upper arm is connected to an OUT terminal of an upper arm drive circuit 113. The emitter terminal of the switching element 105 is connected to a VS terminal of the upper arm drive circuit 113.

A gate terminal of the switching element 102 included in the U-phase lower arm is connected to a UOUT terminal of a lower arm drive circuit 114. An emitter terminal of the switching element 102 is connected to an NU terminal of the power module 100.

A gate terminal of the switching element 104 included in the V-phase lower arm is connected to a VOUT terminal of the lower arm drive circuit 114. An emitter terminal of the switching element 104 is connected to an NV terminal of the power module 100.

A gate terminal of the switching element 106 included in the W-phase lower arm is connected to a WOUT terminal of the lower arm drive circuit 114. An emitter terminal of the switching element 106 is connected to an NW terminal of the power module 100.

The NU terminal, the NV terminal, and the NW terminal of the power module 100 are lumped together outside the power module 100 and are connected to one terminal of a current-detection shunt resistor 121. The other terminal of the shunt resistor 121 is connected to a negative electrode terminal VDC(−) of the direct-current power source. Furthermore, the one terminal of the shunt resistor 121 is connected to one terminal of a resistor 122. The other terminal of the resistor 122 is connected to one terminal of a capacitor 123, a cathode terminal of a diode 124, and an IS terminal of the power module 100. The other terminal of the capacitor 123 is connected to ground of a printed-circuit board on which the power module 100 is mounted. An anode terminal of the diode 124 is connected to the ground of the printed-circuit board. The IS terminal of the power module 100 is connected to an IS terminal of the lower arm drive circuit 114.

Furthermore, the other terminal of the shunt resistor 121 is connected via a ground wiring 125 of the printed-circuit board to a COM terminal of the power module 100. The COM terminal of the power module 100 is connected to the ground of the printed-circuit board. In the power module 100, the COM terminal is connected to GND terminals of the upper arm drive circuits 111, 112, and 113 and a GND terminal of the lower arm drive circuit 114.

In addition, the power module 100 has an IN(HU) terminal, an IN (HV) terminal, an IN (HW) terminal, an IN(LU) terminal, an IN(LV) terminal, and an IN(LW) terminal at which the power module 100 receives a control signal from an upper controller. The IN(HU) terminal is connected to an IN terminal of the upper arm drive circuit 111. The IN(HV) terminal is connected to an IN terminal of the upper arm drive circuit 112. The IN(HW) terminal is connected to an IN terminal of the upper arm drive circuit 113. The IN(LU) terminal, the IN(LV) terminal, and the IN(LW) terminal are connected to a UIN terminal, a VIN terminal, and a WIN terminal, respectively, of the lower arm drive circuit 114.

With the power module 100, the upper arm drive circuit 111, 112, or 113 on-off drives the switching element 101, 103, or 105 by a control signal inputted to the IN(HU) terminal, the IN(HV) terminal, or the IN(HW) terminal. Similarly, when a control signal is inputted to the IN(LU) terminal, the IN(LV) terminal, or the IN(LW) terminal, the lower arm drive circuit 114 on-off drives the switching element 102, 104, or 106.

When one of the switching elements 102, 104, and 106 is turned on by the lower arm drive circuit 114, a current flowing through the switching element 102, 104, or 106 flows via the shunt resistor 121 to the negative electrode terminal VDC(−) of the direct-current power source. At this time the current flowing through the switching element 102, 104, or 106 is converted by the shunt resistor 121 to a voltage signal and is fed back to the lower arm drive circuit 114. The lower arm drive circuit 114 monitors the voltage signal fed back to the IS terminal and detects an overcurrent and a short circuit of the switching element 102, 104, or 106.

The power module 100 detects an overcurrent and a short circuit of the lower-arm switching element 102, 104, or 106 in this way by the use of the shunt resistor 121. Accordingly, the NU terminal, the NV terminals, and the NW terminal which are ground-side terminals of the lower-arm switching elements 102, 104, and 106 respectively and the COM terminal which is a ground-side terminal of the upper arm drive circuits 111, 112, and 113 and the lower arm drive circuit 114 are connected not inside the power module 100 but outside the power module 100. This connection is made by the ground wiring 125 routed and formed around the power module 100 on the printed-circuit board. As a result, the driving impedance of the lower arm drive circuit 114 includes the gate-emitter impedance of the switching element 102, 104, or 106, the impedance of the shunt resistor 121, the impedance of the ground wiring 125, and the impedance of an internal wiring between the COM terminal and the GND terminal of the lower arm drive circuit 114.

The ground wiring 125 is long compared with an internal wiring of the lower arm drive circuit 114. That is to say, the impedance of the ground wiring 125 includes many resistance components, capacitance components, and induction components. As a result, the driving impedance of the lower arm drive circuit 114 is high. The influence of the ground wiring 125 becomes more powerful with an increase in the switching frequency of the switching element 102, 104, or 106. Furthermore, as a current flowing through the switching element 102, 104, or 106 increases, parasitic oscillation of a gate voltage (gate-emitter voltage) tends to occur by the influence of the ground wiring 125. A case where parasitic oscillation does not occur, that is to say, where normal operation is performed and a case where parasitic oscillation occurs, that is to say, where abnormal operation is performed will now be described by the use of the switching waveforms illustrated in FIGS. 6A and 6B.

In FIG. 6A or 6B, a gate-emitter voltage Vge, a collector current Ic, and a collector-emitter voltage Vce of the switching element 102, 104, or 106 are indicated by a dashed line, a thin line, and a thick line respectively.

When the switching element 102, 104, or 106 is turned on and a current having a value smaller than or equal to a rated current value flows, the gate-emitter voltage Vge, the collector current Ic, or the collector-emitter voltage Vce does not change significantly as illustrated in FIG. 6A. At this time the influence of the ground wiring 125 is small. The gate-emitter voltage Vge falls to turn off the switching element 102, 104, or 106. At that timing the collector current Ic decreases and becomes stable. In addition, at that timing the collector-emitter voltage Vce rises and becomes stable.

On the other hand, there is a case where when the switching element 102, 104, or 106 is turned on, a state in which a current having a value greater than a rated current value flows is repeated. In such a case, the parasitic oscillation of the gate-emitter voltage Vge illustrated in FIG. 6B may suddenly occur at the timing at which the switching element 102, 104, or 106 is turned off. If this parasitic oscillation occurs, then a state in which the switching element 102, 104, or 106 is erroneously turned on may arise in a period for which the switching element 102, 104, or 106 is to be in an off state, and the switching element 102, 104, or 106 may break in a short period. Even if a current having a value greater than the rated current value flows when the switching element 102, 104, or 106 is turned on, the switching waveforms illustrated in FIG. 6A are obtained at the time of switching one cycle before the occurrence of the parasitic oscillation illustrated in FIG. 6B.

A technique for suppressing the above parasitic oscillation of a gate voltage is known (see, for example, Japanese Laid-open Patent Publication No. 2016-197821). With Japanese Laid-open Patent Publication No. 2016-197821, for example, parasitic oscillation is suppressed in the following way. Frequency-dependent resistance elements are arranged between a source output terminal of a drive circuit and a gate terminal of a switching element and between a sync output terminal of the drive circuit and the gate terminal of the switching element. The rising operation and the falling operation of the switching element are individually optimized.

However, if parasitic oscillation is suppressed by the technique disclosed in Japanese Laid-open Patent Publication No. 2016-197821, then two frequency-dependent resistance elements are needed for each switching element. In addition, the size of a frequency-dependent resistance element itself is large. As a result, the size of a power module itself becomes larger.

SUMMARY OF THE INVENTION

According to an aspect, there is provided a power module with a built-in drive circuit, the power module including a half bridge circuit having a first switching element included in an upper arm thereof, and a second switching element included in a lower arm thereof, an upper arm drive circuit which drives the first switching element, and a lower arm drive circuit which drives the second switching element, the lower arm drive circuit having a ground terminal. The power module includes: a first ground terminal on a ground side of the second switching element; a second ground terminal connected, via a first ground wiring, to the first ground terminal; a third ground terminal connected, via a second ground wiring including a dumping resistor, to the first ground terminal; a current detection circuit which detects a current flowing through the second switching element; and a control ground switching circuit which performs switching according to a value of the current detected by the current detection circuit, so as to connect the ground terminal of the lower arm drive circuit to the second ground terminal or the third ground terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Embodiments will now be described in detail by referring to the drawings with a case where the present disclosure is applied to a three-phase motor drive intelligent power module as an example. Components in the drawings indicated by the same numerals are the same. Furthermore, as long as inconsistency does not arise, a plurality of embodiments may partially be combined and implemented.

Figure 1:
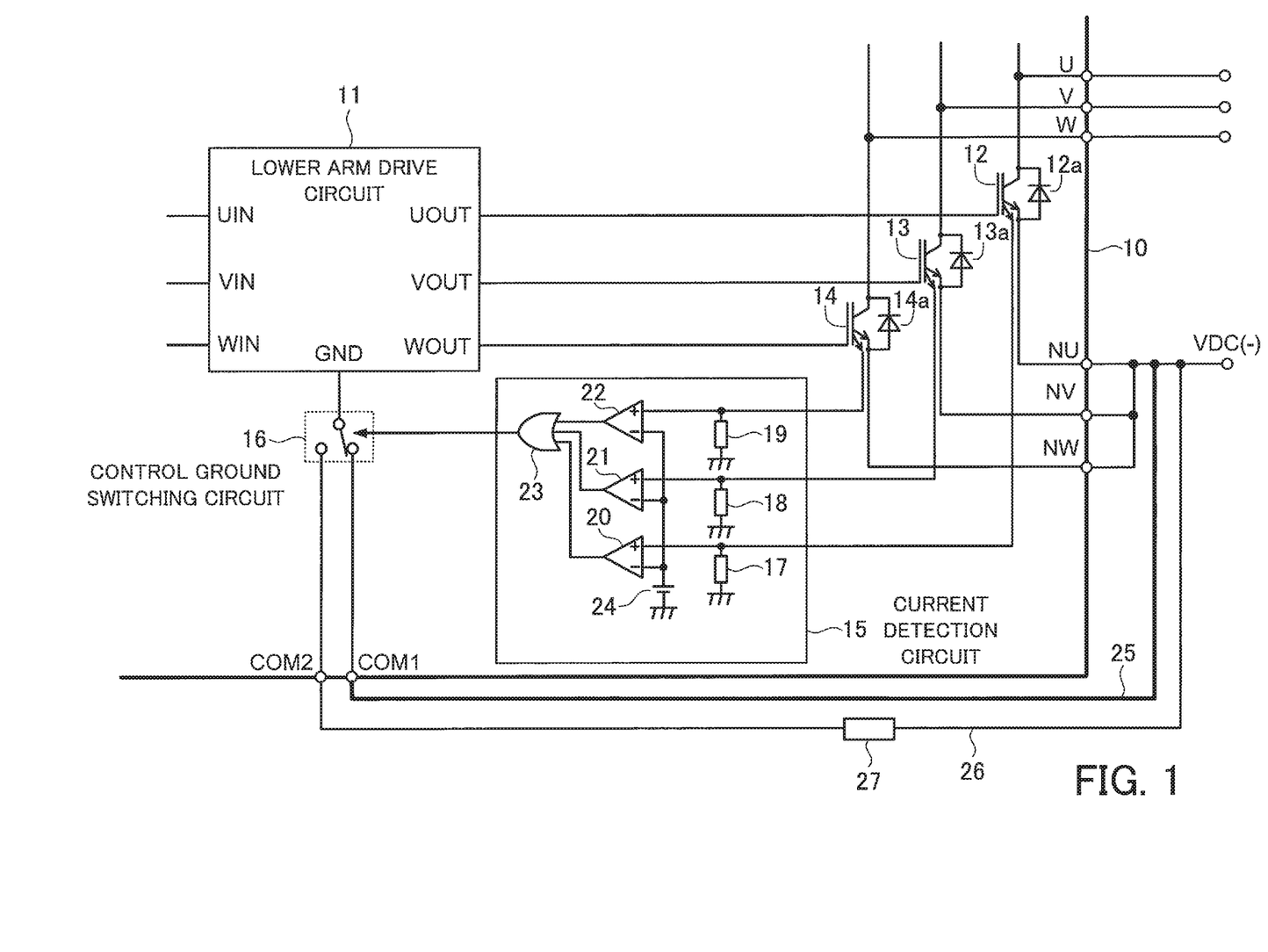
FIG. 1 is a circuit diagram illustrative of part of an intelligent power module according to a first embodiment.
Figure 2:
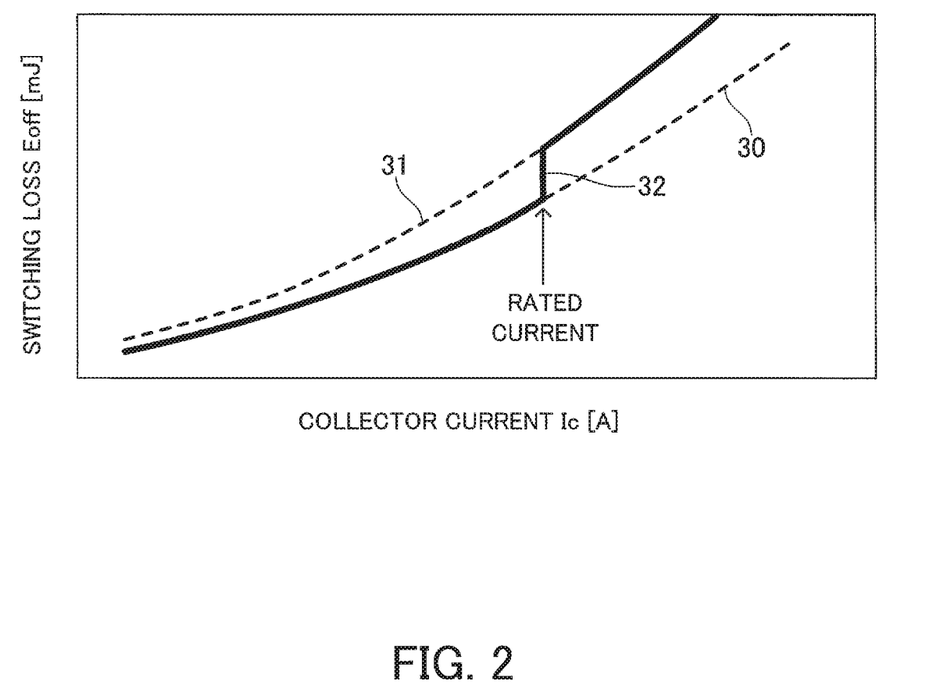
FIG. 2 illustrates a change in switching loss at turn-off time relative to a collector current of a switching element.
Figure 3A:
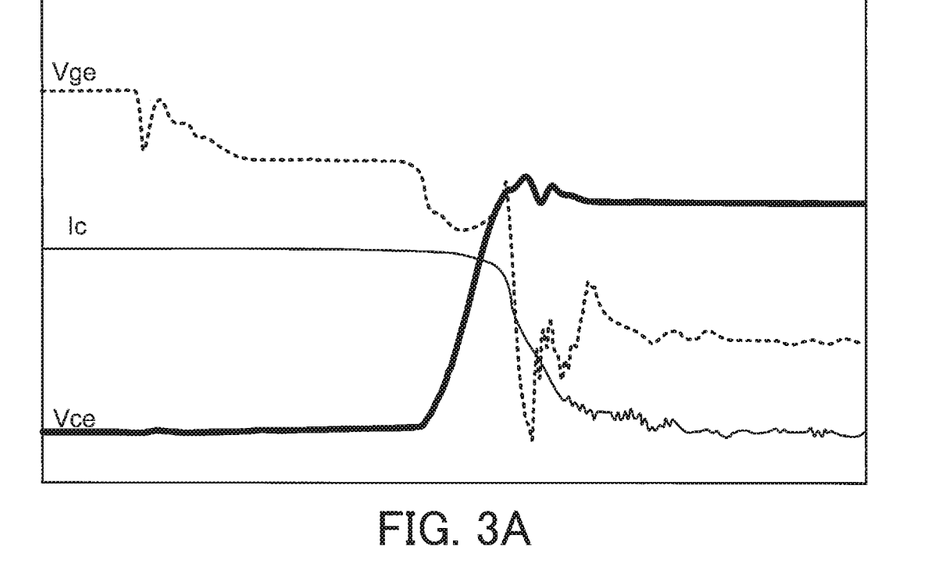
FIGS. 3A and 3B illustrate switching waveforms of a switching element at turn-off time, FIG. 3A illustrating switching waveforms obtained in a case where a dumping resistor is not included, FIG. 3B illustrating switching waveforms obtained in a case where a dumping resistor is included.
Figure 3B:
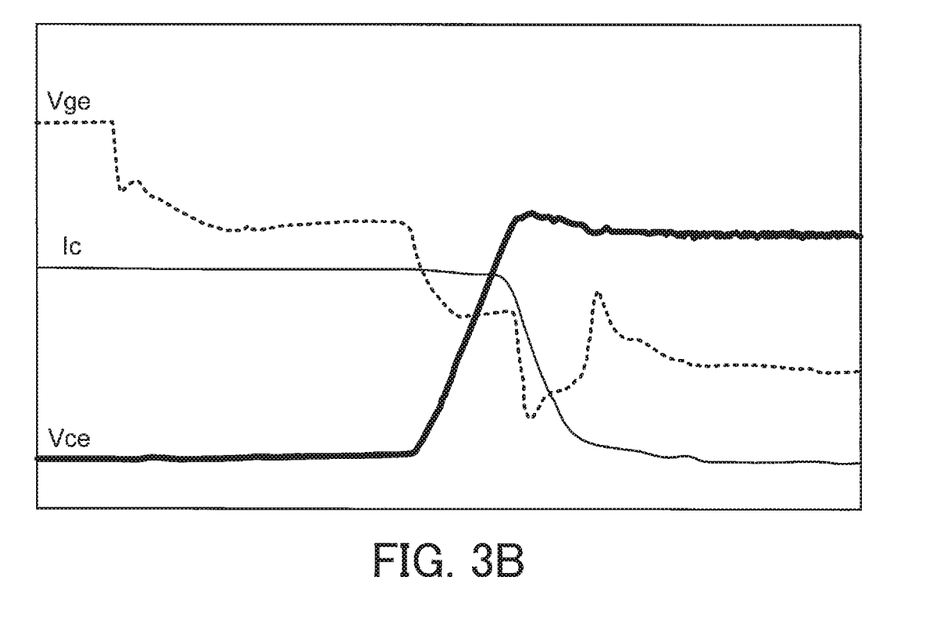

FIG. 1 is a circuit diagram illustrative of part of an intelligent power module according to a first embodiment. FIG. 2 illustrates a change in switching loss at turn-off time relative to a collector current of a switching element. FIGS. 3A and 3B illustrate switching waveforms obtained when a switching element is turned off. FIG. 3A illustrates switching waveforms obtained in a case where a dumping resistor is not used. FIG. 3B illustrates switching waveforms obtained in a case where a dumping resistor is used.

An intelligent power module 10 illustrated in FIG. 1 includes a lower arm drive circuit 11, a switching element 12 included in a U-phase lower arm, a switching element 13 included in a V-phase lower arm, and a switching element 14 included in a W-phase lower arm. Furthermore, the intelligent power module 10 includes a current detection circuit 15 and a control ground switching circuit 16. Each of the switching elements 12, 13, and 14 is an IGBT. A freewheeling diode 12a is connected to collector and emitter terminals of the switching elements 12 in inverse parallel therewith. Similarly, a freewheeling diode 13a is connected to collector and emitter terminals of the switching elements 13 in inverse parallel therewith. A freewheeling diode 14a is connected to collector and emitter terminals of the switching elements 14 in inverse parallel therewith. In addition, each of the switching elements 12, 13, and 14 includes a current sense element which indirectly detects a current proportional to a collector current. With each of the switching elements 12, 13, and 14 in FIG. 1, a main IGBT element and a current sense element are indicated by one IGBT symbol and only an emitter terminal is separated into an emitter terminal of the main IGBT element and a sense emitter terminal of the current sense element.

The lower arm drive circuit 11 has a UIN terminal, a VIN terminal, a WIN terminal, a UOUT terminal, a VOUT terminal, a WOUT terminal, and a GND terminal. The UIN terminal, the VIN terminal, and the WIN terminal are input terminals of signals for controlling the switching elements 12, 13, and 14, respectively, included in the lower arms. The UOUT terminal, the VOUT terminal, and the WOUT terminal are output terminals connected to gate terminals of the switching elements 12, 13, and 14 respectively.

Collector terminals of the switching elements 12, 13, and 14 are connected to a U terminal, a V terminal, and a W terminal, respectively, of the intelligent power module 10. Emitter terminals of the switching elements 12, 13, and 14 are connected to an NU terminal, an NV terminal, and an NW terminal, respectively, of the intelligent power module 10 which are power side ground terminals. Sense emitter terminals of the switching elements 12, 13, and 14 are connected to the current detection circuit 15.

The current detection circuit 15 includes current detection resistors 17, 18, and 19, comparators 20, 21, and 22, and an OR circuit 23. One terminal of the current detection resistor 17 is connected to the sense emitter terminal of the switching element 12 and a non-inverting input terminal of the comparator 20. One terminal of the current detection resistor 18 is connected to the sense emitter terminal of the switching element 13 and a non-inverting input terminal of the comparator 21. One terminal of the current detection resistor 19 is connected to the sense emitter terminal of the switching element 14 and a non-inverting input terminal of the comparator 22. The other terminals of the current detection resistors 17, 18, and 19 are connected to ground of the intelligent power module 10. Inverting input terminals of the comparators 20, 21, and 22 are connected to a positive electrode terminal of a reference voltage source 24 which outputs a reference voltage. A negative electrode terminal of the reference voltage source 24 is connected to the ground of the intelligent power module 10. Output terminals of the comparators 20, 21, and 22 are connected to an input terminal of the OR circuit 23 and an output terminal of the OR circuit 23 is connected to a control terminal of the control ground switching circuit 16.

The control ground switching circuit 16 includes a movable contact connected to the GND terminal of the lower arm drive circuit 11, two fixed contacts, and the control terminal. The movable contact of the control ground switching circuit 16 is connected to the GND terminal of the lower arm drive circuit 11. One of the two fixed contacts is connected to a COM1 terminal (ground terminal on the first drive circuit side, i.e., the second ground terminal) of the intelligent power module 10 and the other is connected to a COM2 terminal (ground terminal on a second drive circuit side, i.e., the third ground terminal) of the intelligent power module 10. The control ground switching circuit 16 is preferably a semiconductor switching element.

The NU terminal, the NV terminal, and the NW terminal of the intelligent power module 10 which are power side ground terminals (i.e., first ground terminals) are connected to a negative electrode terminal VDC(−) of a direct-current power source. Furthermore, the power side ground terminals of the intelligent power module 10 are connected to the COM1 terminal by an ordinary ground wiring 25 formed on a printed-circuit board on which the intelligent power module 10 is mounted. In addition, the NU terminal, the NV terminal, and the NW terminal are connected to the COM2 terminal by a ground wiring 26 including a dumping resistor 27. The dumping resistor 27 is used for suppressing parasitic oscillation and is a frequency-dependent resistance element such as a chip ferrite bead or a bead core.

With the intelligent power module 10 of FIG. 1, only the components related to the lower arms of half bridge circuits are illustrated. As illustrated in FIG. 5, however, in reality the intelligent power module 10 also includes an upper arm drive circuit and switching elements related to upper arms of the half bridge circuits.

In the current detection circuit 15, a current outputted from the sense emitter terminal of the switching element 12, 13, or 14 is supplied to the current detection resistor 17, 18, or 19. By doing so, a collector current is converted to a voltage and is detected. The value of the reference voltage of the reference voltage source 24 corresponds to a rated current value of the switching element 12, 13, or 14. Accordingly, the comparator 20, 21, or 22 compares the voltage detected by the current detection resistor 17, 18, or 19 with the reference voltage. If a value of the collector current of the switching element 12, 13, or 14 is smaller than or equal to the rated current value, then the comparator 20, 21, or 22 outputs a ground level (L level) signal. If a value of the collector current of the switching element 12, 13, or 14 is greater than the rated current value, then the comparator 20, 21, or 22 outputs a power source voltage level (H level) signal. When all of the comparators 20, 21, and 22 output an L level signal, the OR circuit 23 outputs an L level signal. When one of the comparators 20, 21, and 22 outputs an H level signal, the OR circuit 23 outputs an H level signal.

When an L level signal is inputted as a control signal from the current detection circuit 15, the control ground switching circuit 16 functions so as to connect the GND terminal (ground terminal) of the lower arm drive circuit 11 and the COM1 terminal of the intelligent power module 10. As a result, the COM1 terminal of the intelligent power module 10 which is a ground terminal on the lower arm drive circuit side is connected to the power side ground terminals (the NU terminal, the NV terminal, and the NW terminal) by the ordinary ground wiring 25. At this time the impedance of the ordinary ground wiring 25 is low. Accordingly, the driving impedance of the lower arm drive circuit 11 is also low. This leads to a light switching loss (turn-off loss).

When the comparator 20, 21, or 22 of the current detection circuit 15 detects that a value of a collector current of the switching element 12, 13, or 14 exceeds the rated current value, an H level signal is inputted as a control signal from the current detection circuit 15 to the control ground switching circuit 16. At this time the control ground switching circuit 16 functions so as to connect the GND terminal (ground terminal) of the lower arm drive circuit 11 and the COM2 terminal of the intelligent power module 10. As a result, the COM2 terminal of the intelligent power module 10 is connected to the power side ground terminals (the NU terminal, the NV terminal, and the NW terminal) by the ground wiring 26 including the dumping resistor 27. Because the dumping resistor 27 is inserted between the NU terminal, the NV terminal, and the NW terminal and the COM2 terminal, the driving impedance of the lower arm drive circuit 11 becomes higher. As a result, the switching loss (turn-off loss) of the switching element 12, 13, or 14 increases. However, parasitic oscillation of a gate voltage at the time of turn-off of the switching element 12, 13, or 14 is reduced.

A change in switching loss which occurs when the control ground switching circuit 16 switches a ground wiring is illustrated in FIG. 2. In FIG. 2, a horizontal axis indicates a collector current of the switching element 12, 13, or 14 and a vertical axis indicates switching loss at turn-off time. In FIG. 2, a curve 30 indicates a change in switching loss relative to a change in the collector current Ic obtained at the time of connecting the NU terminal, the NV terminal, and the NW terminal and the COM1 terminal only by the ordinary ground wiring 25. Switching loss is light in the whole range of the collector current Ic. On the other hand, a curve 31 indicates a change in switching loss relative to a change in the collector current Ic obtained at the time of connecting the NU terminal, the NV terminal, and the NW terminal and the COM2 terminal by the ground wiring 26 including the dumping resistor 27. Switching loss becomes heavier in the whole range of the collector current Ic. In the present disclosure, a rated current value is detected and switching to the ordinary ground wiring 25 or the ground wiring 26 including the dumping resistor 27 is performed. By doing so, switching loss is made to change like a curve 32. That is to say, when a value of the collector current Ic is smaller than or equal to the rated current value and does not cause parasitic oscillation of a gate voltage, the dumping resistor 27 is not included. Accordingly, switching loss is light. When a value of the collector current Ic is greater than the rated current value, switching loss is made heavy by the use of the dumping resistor 27. This suppresses the occurrence of parasitic oscillation.

As stated above, the impedance of a ground wiring is switched according to a current value of the switching element 12, 13, or 14. This optimizes switching loss while suppressing parasitic oscillation of a gate voltage.

Switching waveforms of the switching element 12, 13, or 14 obtained when the control ground switching circuit 16 switches a ground wiring are illustrated in FIGS. 3A and 3B. FIG. 3A illustrates switching waveforms obtained in a case where the power side ground terminals and the ground terminal on the lower arm drive circuit side are connected only by the ordinary ground wiring 25 not including the dumping resistor 27. FIG. 3B illustrates switching waveforms obtained in a case where the power side ground terminals and the ground terminal on the lower arm drive circuit side are connected by the ground wiring 26 including the dumping resistor 27. In FIGS. 3A and 3B, a gate-emitter voltage Vge, which is a gate voltage, a collector current Ic, and a collector-emitter voltage Vce of the switching element 12, 13, or 14 are indicated by a dashed line, a thin line, and a thick line respectively.

As illustrated in FIG. 3A, when a value of the collector current Ic is smaller than or equal to the rated current value, parasitic oscillation does not occur. As illustrated in FIG. 3B, when a value of the collector current Ic is greater than the rated current value, the occurrence of parasitic oscillation is suppressed. The reason for this is as follows. The driving impedance of the lower arm drive circuit 11 rises due to the dumping resistor 27 and a gate voltage at turn-off time is controlled.

In this embodiment, the current detection circuit 15 and the control ground switching circuit 16 are arranged outside the lower arm drive circuit 11. However, the function of one of the current detection circuit 15 and the control ground switching circuit 16 or the functions of both of the current detection circuit 15 and the control ground switching circuit 16 may be incorporated into the lower arm drive circuit 11.

Furthermore, in this embodiment a shunt resistor is not used for detecting a current of the switching element 12, 13, or 14. However, the current detection circuit 15 detects a current of the switching element 12, 13, or 14. Accordingly, a detection signal from the current detection circuit 15 is used. That is to say, the lower arm drive circuit 11 monitors a detection signal outputted by the current detection circuit 15 to perform overcurrent protection and load short-circuit protection. A shunt resistor is not needed. As a result, the driving impedance of the lower arm drive circuit 11 is decreased further and switching loss is reduced further.

Figure 4:
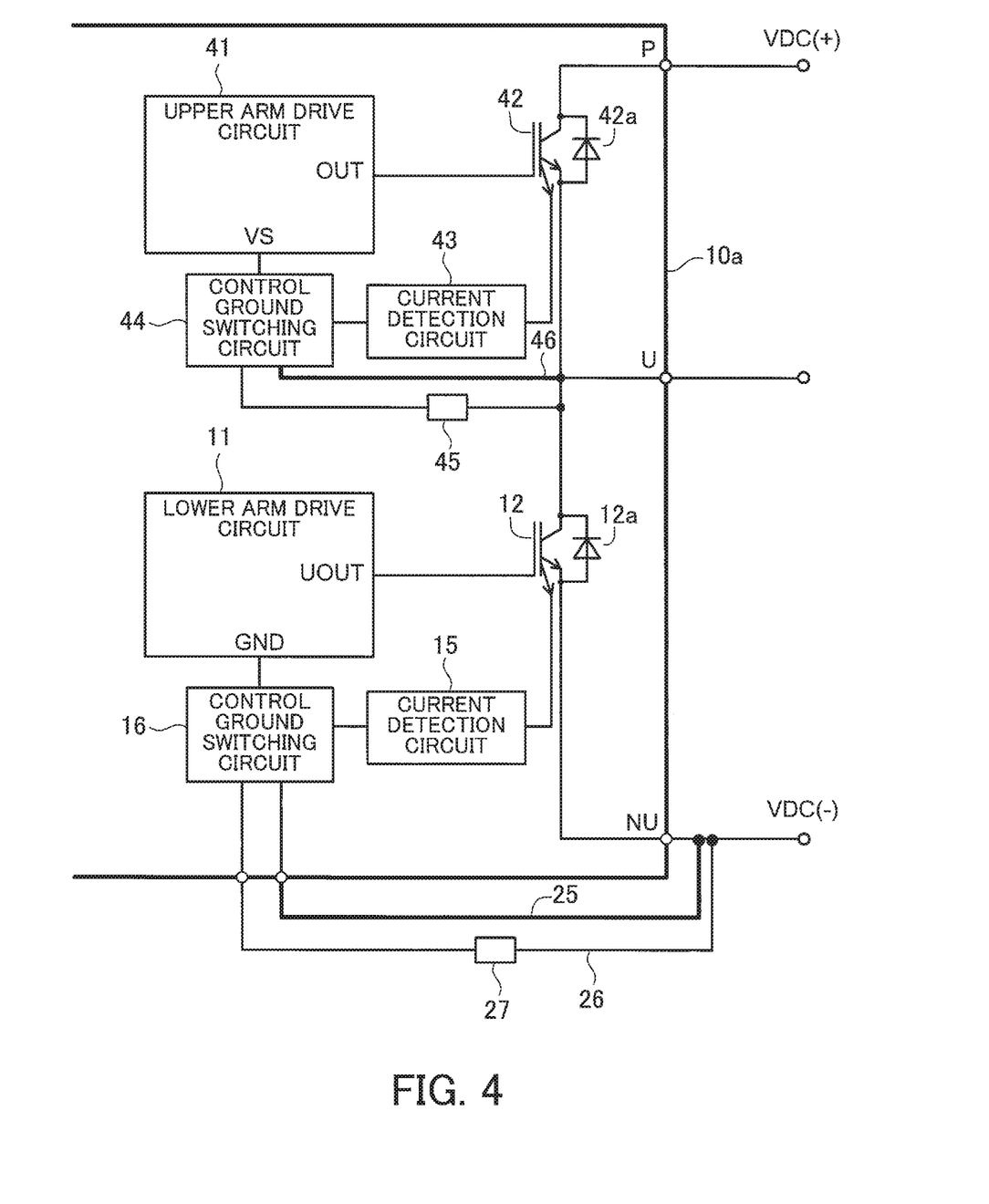
FIG. 4 is a circuit diagram illustrative of part of an intelligent power module according to a second embodiment.

FIG. 4 is a circuit diagram illustrative of part of an intelligent power module according to a second embodiment. Components in FIG. 4 which are the same as or equivalent to those illustrated in FIG. 1 are marked with the same numerals and detailed descriptions of them will be omitted. Furthermore, in order to simplify a figure, only circuits related to the U phase are illustrated in FIG. 4.

With an intelligent power module 10a according to a second embodiment, not only the driving impedance of a ground wiring of a lower arm drive circuit 11 but also the driving impedance of a corresponding wiring of an upper arm drive circuit are switched according to a current value.

FIG. 4 illustrates only the circuits related to the U phase. However, the structure of a lower arm in the intelligent power module 10a is the same as that of the lower arm in the intelligent power module 10 illustrated in FIG. 1. Accordingly, a detailed description of a lower arm drive circuit 11 will be omitted. Furthermore, only the circuits related to the U phase are illustrated as the structure of an upper arm. Circuits related to the V phase and the W phase are the same as those related to the U phase illustrated in FIG. 4 and are omitted.

The intelligent power module 10a includes a U-phase upper arm drive circuit 41, a switching element 42 included in the upper arm of a U-phase half bridge circuit, a current detection circuit 43, a control ground switching circuit 44, and a dumping resistor 45. A freewheeling diode 42a is connected to collector and emitter terminals of the switching element 42 in inverse parallel therewith. The switching element 42 includes a current sense element. This is the same with a switching element 12 included in the U-phase lower arm.

The upper arm drive circuit 41 has an OUT terminal and a VS terminal. The OUT terminal is connected to a gate terminal of the switching element 42. The VS terminal specifies U-phase upper arm reference potential and is connected to the control ground switching circuit 44.

The collector terminal of the switching element 42 is connected to a P terminal of the intelligent power module 10a and the emitter terminal of the switching element 42 is connected to a U terminal of the intelligent power module 10a. A sense emitter terminal of the switching element 42 is connected to the current detection circuit 43.

The connection point of the emitter terminal of the switching element 42 and the U terminal of the intelligent power module 10a is connected via an upper arm reference potential wiring 46 to the control ground switching circuit 44. Furthermore, the connection point of the emitter terminal of the switching element 42 and the U terminal of the intelligent power module 10a is connected via a dumping resistor 45 to the control ground switching circuit 44. The current detection circuit 43 includes a current detection resistor, a comparator, and a reference voltage source. This is the same with a lower arm current detection circuit 15.

However, the current detection circuit 43 detects only a current value of the switching element 42. Accordingly, the lower arm current detection circuit 15 includes current detection resistors and comparators for the other phases and an OR circuit, but the current detection circuit 43 does not include them.

With the intelligent power module 10a the current detection circuit 43 monitors a current value of the switching element 42. When a current value of the switching element 42 is smaller than or equal to the rated current value of the switching element 42, the current detection circuit 43 outputs an L level signal. As a result, the control ground switching circuit 44 connects the VS terminal of the upper arm drive circuit 41 to the upper arm reference potential wiring 46. When a current value of the switching element 42 is greater than the rated current value of the switching element 42, the current detection circuit 43 outputs an H level signal. The control ground switching circuit 44 connects the VS terminal of the upper arm drive circuit 41 to the dumping resistor 45. As a result, the driving impedance of the upper arm drive circuit 41 becomes higher and the occurrence of parasitic oscillation of a gate voltage of the switching element 42 at turn-off time is suppressed.

With the power module with the built-in drive circuit having the above structure, the driving impedance of a switching element is made high when a current having a value greater than a rated current value flows through the switching element. By doing so, the value of a current flowing through the switching element is held. Accordingly, parasitic oscillation at turn-off time is suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A power module with a built-in drive circuit, the power module including
    a half bridge circuit having a first switching element included in an upper arm thereof, and a second switching element included in a lower arm thereof,
    an upper arm drive circuit which drives the first switching element, and
    a lower arm drive circuit which drives the second switching element, the lower arm drive circuit having a ground terminal,
the power module comprising:
    a first ground terminal on a ground side of the second switching element;
    a second ground terminal connected, via a first ground wiring, to the first ground terminal;
    a third ground terminal connected, via a second ground wiring including a dumping resistor, to the first ground terminal;
    a current detection circuit which detects a current flowing through the second switching element; and
    a control ground switching circuit which performs switching according to a value of the current detected by the current detection circuit, so as to connect the ground terminal of the lower arm drive circuit to the second ground terminal or the third ground terminal.

2. The power module with the built-in drive circuit according to claim 1, wherein
the second switching element has a current sense element incorporated therein, and
the current detection circuit includes:
a current detection resistor which converts a current outputted by the current sense element to a voltage signal;
a reference voltage source which outputs a reference voltage corresponding to a rated current value of the second switching element; and
a comparator which compares the voltage signal with the reference voltage and which outputs a switching control signal for controlling switching of the control ground switching circuit.

3. The power module with the built-in drive circuit according to claim 2, wherein:
when the switching control signal received by the control ground switching circuit from the current detection circuit indicates that the voltage signal is lower than or equal to the reference voltage, the control ground switching circuit connects the ground terminal of the lower arm drive circuit to the second ground terminal; and
when the switching control signal received by the control ground switching circuit from the current detection circuit indicates that the voltage signal is higher than the reference voltage, the control ground switching circuit connects the ground terminal of the lower arm drive circuit to the third ground terminal.

4. The power module with the built-in drive circuit according to claim 1, wherein the second switching element is an insulated gate bipolar transistor (IGBT) and a freewheeling diode, or a metal-oxide-semiconductor field-effect transistor (MOSFET).

5. The power module with the built-in drive circuit according to claim 1,
wherein the upper arm drive circuit has an upper arm reference potential terminal, and
wherein the power module further includes:
an upper arm current detection circuit which detects a current flowing through the first switching element;
an upper arm control ground switching circuit which has a first terminal and a second terminal, and which performs switching according to a value of the current detected by the upper arm current detection circuit, so as to connect the upper arm reference potential terminal of the upper arm drive circuit to the first terminal or the second terminal;
an upper arm reference potential wiring which connects a connection point of the first switching element and the second switching element to the first terminal of the upper arm control ground switching circuit; and
an upper arm dumping resistor connected between said connection point and the second terminal of the upper arm control ground switching circuit.

6. The power module with the built-in drive circuit according to claim 5, wherein each of the first switching element and the second switching element is an IGBT and a freewheeling diode, or a MOSFET.

* * * * *